(12) United States Patent
Fulton et al.

(10) Patent No.: US 8,432,075 B2
(45) Date of Patent: Apr. 30, 2013

(54) ELECTRIC MACHINE HAVING AN INTEGRATED COOLANT LEVEL SENSOR

(75) Inventors: David A. Fulton, Anderson, IN (US); Bradley D. Chamberlin, Pendleton, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 254 days.

(21) Appl. No.: 13/007,243

(22) Filed: Jan. 14, 2011

(65) Prior Publication Data

US 2012/0181884 A1    Jul. 19, 2012

(51) Int. Cl.
*H02K 9/00*    (2006.01)
(52) U.S. Cl.
USPC .............................................. 310/54; 310/52

(58) Field of Classification Search ............... 310/52–59
See application file for complete search history.

(56) References Cited

U.S. PATENT DOCUMENTS

| | | | | |
|---|---|---|---|---|
| 4,329,849 | A * | 5/1982 | Hofmann et al. | 62/50.7 |
| 6,617,738 | B2 * | 9/2003 | Dickinson | 310/178 |
| 7,919,890 | B2 * | 4/2011 | Taketsuna | 310/54 |
| 2003/0173840 | A1 * | 9/2003 | Seniawski et al. | 310/54 |
| 2007/0278869 | A1 * | 12/2007 | Taketsuna | 310/54 |

* cited by examiner

*Primary Examiner* — Thanh Lam
(74) *Attorney, Agent, or Firm* — Cantor Colburn LLP

(57) ABSTRACT

An electric machine includes a housing having a coolant collection area, a stator mounted within the housing, a rotor assembly rotatably mounted within the housing relative to the stator, and a coolant level sensor arranged at the coolant collection area. The coolant level sensor includes a sensing surface configured and disposed to detect a level of coolant collected in the coolant collection area.

6 Claims, 2 Drawing Sheets

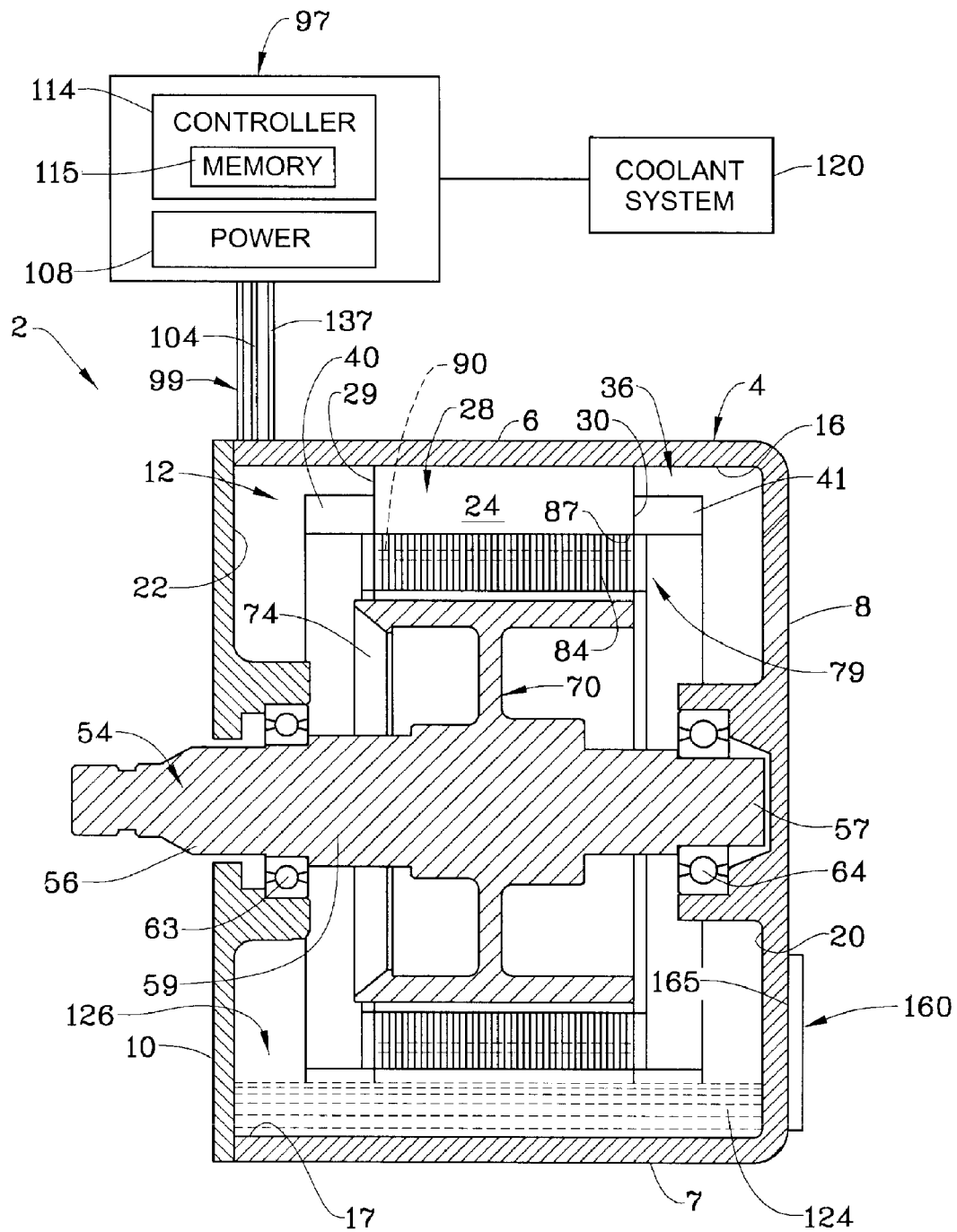

ELECTRIC MACHINE HAVING AN INTEGRATED COOLANT LEVEL SENSOR

BACKGROUND OF THE INVENTION

Exemplary embodiments pertain to the art of electric machines and, more particularly, to an electric machine having an integrated coolant level sensor.

Electric machines produce work from electrical energy passing through a stator to induce an electro-motive force in a rotor. The electro-motive force creates a rotational force at the rotor. The rotation of the rotor is used to power various external devices. Of course, electric machines can also be employed to produce electricity from a work input. In either case, electric machines are currently producing greater outputs at higher speeds and are being designed in smaller packages. The higher power densities and speeds often result in harsh operating conditions such as high internal temperatures, vibration and the like. Accordingly, many conventional electric machines include coolant systems that are configured to lower temperatures of internal components.

Coolant systems include airflow systems, water based coolant systems, oil based coolant systems and glycol based coolant systems. Airflow systems typically include fans that direct a convective airflow through the electric machine. Water based coolant systems typically circulate water through a jacket that extends about the electric machine. Oil based systems introduce oil or other forms of coolant directly into the electric machine. The coolant flows onto, for example, stator windings and collects in a lower portion of the machine. The coolant is then directed to a heat exchange member. The heat exchange member extracts entrained heat from the coolant. The coolant is then passed back through the electric machine.

BRIEF DESCRIPTION OF THE INVENTION

Disclosed is an electric machine including a housing having a coolant collection area, a stator mounted within the housing, a rotor assembly rotatably mounted within the housing relative to the stator, and a coolant level sensor arranged at the coolant collection area. The coolant level sensor includes a sensing surface configured and disposed to detect a level of coolant collected in the coolant collection area.

Also disclosed is a method of operating an electric machine including flowing a coolant into an interior portion of a housing of the electric machine, and sensing a level of coolant in a coolant collection area within the interior portion with a coolant level sensor arranged at the housing.

BRIEF DESCRIPTION OF THE DRAWINGS

The following descriptions should not be considered limiting in any way. With reference to the accompanying drawings, like elements are numbered alike:

FIG. 2 depicts an electric machine including an integrated coolant level sensor in accordance with another aspect of the exemplary embodiment.

DETAILED DESCRIPTION OF THE INVENTION

Figure 1:
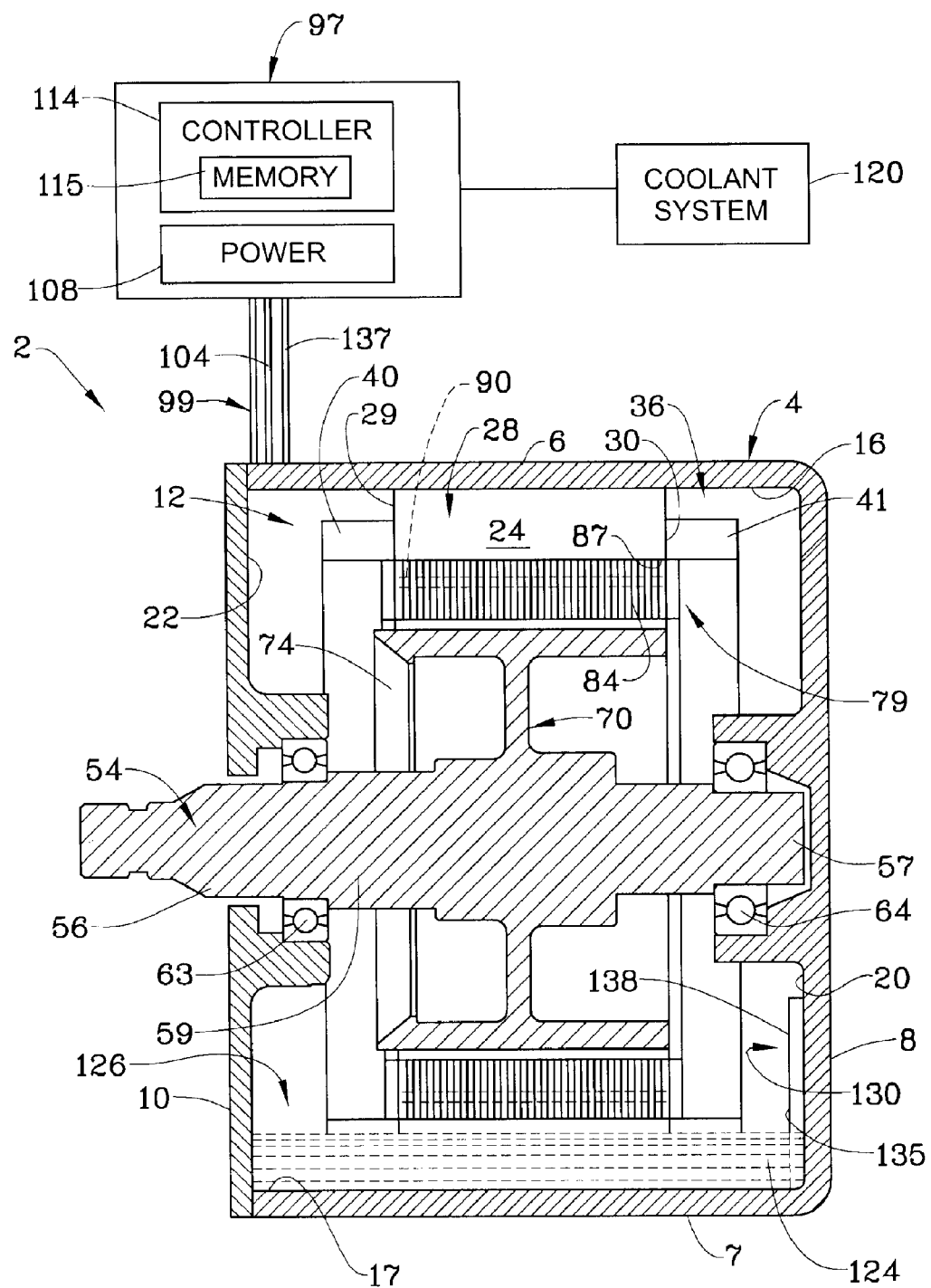
FIG. 1 depicts an electric machine including an integrated coolant level sensor in accordance with an exemplary embodiment.

A detailed description of one or more embodiments of the disclosed apparatus and method are presented herein by way of exemplification and not limitation with reference to the Figures.

Exemplary embodiments provide a coolant level sensor that is integrated directly into an electric machine. The coolant level sensor is positioned at a lower portion of a machine housing in an area within which collects coolant. The coolant sensor provides feedback to a controller indicating a level of coolant in the electric machine. Based on the level of coolant, the controller adjusts coolant flow into the electric machine. In this manner, the controller ensures that coolant does not rise to a level that might interfere with moving components in the electric machine. More specifically, coolant interfering with moving components or entering an air gap between moving and stationary components could result in a substantial reduction in operational efficiency. In addition, exposure to moving components could result in a break down of the coolant, or the coolant could be caused to change states, or air could be introduced into the coolant. Introduction of air could cause the coolant to foam and lose any heat carrying capacity or suffer a degradation of lubrication capability for bearings, gears, and the like.

An electric machine in accordance with an exemplary embodiment is indicated generally at 2 in the figure. Electric machine 2 includes a housing 4 having first and second side walls 6 and 7 that are joined by a first end wall 8 and a second end wall or cover 10 to collectively define an interior portion 12. First side wall 6 includes an inner surface 16 and second side wall 7 includes an inner surface 17. At this point it should be understood that housing 4 could also be constructed to include a single side wall having a continuous inner surface. In addition, first end wall 8 includes an inner surface 20 and second end wall 10 includes an inner surface 22. Electric machine 2 is further shown to include a stator 24 arranged at inner surfaces 16 and 17 of first and second side walls 6 and 7. Stator 24 includes a body 28, having a first end portion 29 that extends to a second end portion 30, which supports a plurality of windings 36. Windings 36 include a first end turn portion 40 and a second end turn portion 41.

Electric machine 2 is also shown to include a shaft 54 rotatably supported within housing 4. Shaft 54 includes a first end 56 that extends to a second end 57 through an intermediate portion 59. First end 56 is rotatably supported relative to second end wall 10 through a first bearing 63 and second end 57 is rotatably supported relative to first end wall 8 through a second bearing 64. Shaft 54 supports a rotor assembly 70 that is rotatably mounted within housing 4. Rotor assembly 70 includes a hub 74 that is fixed relative to intermediate portion 59, and a rotor lamination assembly 79. Rotor lamination assembly 79 includes a plurality of laminations 84 that are stacked and aligned to define an outer diametric surface 87. In the exemplary embodiment shown, rotor lamination assembly 79 also includes a series of permanent magnets 90 embedded within laminations 84. As such, electric machine 2 takes the form of a permanent magnet electric machine. However, it should be understood that the electric machine in accordance with the exemplary embodiment could take on a variety of forms.

Electric machine 2 is electrically connected to a motor control panel 97 through a power cable 99 that includes a plurality of power conductors, one of which is indicated at 104, that electrically couple stator 24 with a power source 108 having terminals (not shown) arranged in motor control panel 97. Motor control panel 97 also houses a controller 114, having a memory 115, that may be employed to control motor starting, motor speed, and/or motor shut down, as well as various other operating parameters as will be discussed more fully below. In the exemplary embodiment shown, controller 114 is linked to a coolant system 120 that delivers a coolant 124, such as mixtures containing oil through housing 4. By "through" it should be understood that coolant system 120 can not only be configured to direct a flow of coolant directly into housing 4 and/or onto first and second bearings 63 and 64, but may also be configured to direct a flow of coolant onto first and second end turn portions 40 and 41 of stator 24. Coolant 124 enters housing 4 through an inlet (not shown) provided on, for example, side wall 6 and exits housing 4 through an outlet (also not shown) provided on side wall 7. As such, during operation, coolant 124 collects in a coolant collection zone or area 126 at lower portion (not separately labeled) of interior portion 12.

In accordance with an exemplary embodiment, electric machine 2 includes a coolant level sensor 130, which, in the exemplary embodiment shown, is mounted to inner surface 20 of second end wall 8. More specifically, coolant level sensor 130 is mounted in the lower portion of interior portion 12 at coolant collection area 126. In accordance with one aspect of the exemplary embodiment, coolant level sensor 130 takes the form of a capacitive sensor 135 having a sensing surface 138 that directly senses a level of coolant in coolant collection area 126. Capacitive sensor 135 provides a signal to controller 114 through a sensing line 137 that is representative of the level of coolant 124 in coolant collection area 126. More specifically, as coolant 124 rises in coolant collection area 126 moving along sensing surface 138, a capacitance of capacitive sensor 124 changes. The change in capacitance leads to a change in voltage/current that is passed to controller 114. The change in voltage/current is compared to data in a look up table stored in memory 115 and correlated to a level of coolant 124 in coolant collection area 126. In accordance with another aspect of the exemplary embodiment illustrated in FIG. 2, wherein like reference numbers refer to corresponding parts in the respective views, electric machine 2 is shown to include a coolant level sensor 160 mounted to an outer surface of first end wall 8 at coolant collection area 126. Coolant level sensor 160 takes the form of a capacitive sensor having a sensing surface 165 that detects the level of coolant in coolant collection area 126 without being directly exposed to the coolant. Of course, it should be understood that other forms of sensors could also be employed.

In this manner, controller 114 can then control coolant delivery in electric machine 2 based on coolant level in coolant collection area 126. Adjusting coolant flow ensures that coolant 124 does not rise to a level that would reach moving components in interior portion 12. In addition to controlling coolant flow, controller 114 provides an alarm and may be configured to initiate an electric machine shut down if the coolant rises above or falls below a predetermined level in interior portion 12. As such, coolant level sensor 130 also provides an indication of any clogs or flow restrictions that may exist at or upstream from the coolant inlet or downstream from the coolant outlet. In this manner, coolant level sensor 130, in conjunction with controller 114, enhances an overall operational life of electric machine 2. More specifically, controller 114 ensures that not only are the internal components properly lubricated and allowed to rotate without restriction, but the addition of coolant level sensor ensures that the coolant is not subjected to forces that may lead to premature breakdown or that the electric machine is not operated with an excess of coolant that could degrade operation.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An electric machine comprising:
   a housing having a coolant collection area;
   a stator mounted within the housing;
   a rotor assembly rotatably mounted within the housing relative to the stator; and
   a coolant level sensor arranged at the coolant collection area, the coolant level sensor including a sensing surface configured and disposed to detect a level of coolant collected in the coolant collection area.

2. The electric machine according to claim 1, wherein the coolant level sensor is a capacitive sensor.

3. The electric machine according to claim 1, further comprising: a coolant system configured and disposed to direct a flow of coolant through the housing.

4. The electric machine according to claim 3, further comprising: a controller configured and disposed to deliver the flow of coolant through the housing based on the level of coolant sensed by the coolant level sensor.

5. The electric machine according to claim 1, wherein the housing includes a plurality of side walls that define an interior portion, the coolant level sensor being arranged on an inner surface of one of the plurality of side walls in the coolant collection area.

6. The electric machine according to claim 1, wherein the housing includes a plurality of side walls that define an interior portion, the coolant level sensor being arranged on an outer surface of one of the plurality of side walls at the coolant collection area.

* * * * *